United States Patent [19]
Greenspan et al.

[11] Patent Number: 5,893,157
[45] Date of Patent: Apr. 6, 1999

[54] BLOCKING SYMBOL CONTROL IN A COMPUTER SYSTEM TO SERIALIZE ACCESSING A DATA RESOURCE BY SIMULTANEOUS PROCESSOR REQUESTS

[75] Inventors: Steven Jay Greenspan, Hyde Park; Casper Anthony Scalzi; Kenneth Ernest Plambeck, both of Poughkeepsie, all of N.Y.

[73] Assignee: International Business Machines Corporation, Armonk, N.Y.

[21] Appl. No.: 864,402

[22] Filed: May 28, 1997

[51] Int. Cl.$^6$ ..................................................... G06F 12/00
[52] U.S. Cl. ............................. 711/150; 711/151; 711/152
[58] Field of Search .................................... 711/150, 151, 711/152

[56] References Cited

U.S. PATENT DOCUMENTS

| | | | |
|---|---|---|---|
| 4,851,990 | 7/1989 | Johnson et al. | 395/280 |
| 5,081,572 | 1/1992 | Arnold | 711/163 |
| 5,142,676 | 8/1992 | Fried et al. | 711/152 |
| 5,333,297 | 7/1994 | Lemaire et al. | 395/500 |
| 5,410,697 | 4/1995 | Baird et al. | 711/152 |
| 5,488,729 | 1/1996 | Vegesna et al. | 395/385 |
| 5,574,922 | 11/1996 | James | 395/561 |
| 5,590,326 | 12/1996 | Manabe | 711/150 |
| 5,623,671 | 4/1997 | Ando et al. | 395/726 |
| 5,636,361 | 6/1997 | Ingerman | 711/150 |
| 5,659,711 | 8/1997 | Sugita | 711/144 |
| 5,669,002 | 9/1997 | Buch | 395/726 |
| 5,696,939 | 12/1997 | Iacobovici et al. | 711/150 |

*Primary Examiner*—Krisna Lim
*Attorney, Agent, or Firm*—Marc A. Ehrlich; Bernard M. Goldman

[57] ABSTRACT

PLO (perform locked operation) instructions containing blocking symbols are executed on each of multiple processors in a computer system to control coherence in data structures which may be changed by any of multiple processors in a computer system. The blocking symbol is extracted from a PLO instruction instance when invoked by its executing processor. Then the processor hashes the blocking symbol using hardware-microcode (H-M) to generate the location of a lock field in protected storage. The PLO instruction's blocking symbol is associated with a computer resource unit by software providing the PLO instruction, and the blocking symbol then associates the resource with a protected lock through the hashing operation on the blocking symbol. A processor must obtain the lock for a blocking symbol before the executing PLO instruction instance is allowed to make access and change the resource unit associated with the blocking symbol. The blocking symbol controls the PLO operations by serializing simultaneously PLO instruction access requests being made by multiple processors to the same resource unit using the same blocking symbol to allow only one PLO instruction instance to have exclusive access to the resource at a time.

18 Claims, 5 Drawing Sheets

BLOCKING SYMBOL CONTROL IN A COMPUTER SYSTEM TO SERIALIZE ACCESSING A DATA RESOURCE BY SIMULTANEOUS PROCESSOR REQUESTS

INTRODUCTION

This invention provides a new method of serializing simultaneously executing requests for storage access made by multiple processors. This invention serializes simultaneous processor requests for instruction executions for accessing the same data unit. Where serialization is important to operations in a computer system, this invention enables such serialization to be controlled by software—by having the software insert the same blocking symbol into all instructions which may make conflicting simultaneous requests. Using the same blocking symbol in simultaneously executing instructions forces their processors to serially execute the simultaneously occurring instructions. One place such processor execution serialization is essential is for simultaneous access/change requests to the same set of data elements in order to maintain the data integrity of the data elements relative to each other, for which uncoordinated simultaneous change requests to the same data element executed at the same time by multiple processors may make the data element content unpredictable in the set and therefore unreliable.

BACKGROUND

Today parallel execution of processes is common in computer systems, and the serialization problem addressed in this application has been addressed in prior computer systems, but the prior techniques have not been as effective or able to obtain the efficiency of system operation attainable with the subject invention. The problem is that situations often exist where shared data cannot be accessed and modified in parallel, and where such processes must execute in series in order to preserve the integrity of the data in a computer system. The invention deals with these types of situations for preserving the integrity of shared data contained in data structures in a computer system. The data structures are herein referred to as "resources" of the computer system, which for example include data files, queues of any type, buffers for temporarily holding data, changeable programs, etc.; in other words, any computer data structure which may be changed by parallel processes.

Serialization of the use of a resource by multiple processes (programs being executed by multiple processors) means that only one process at a time uses the resource, and the uses by any process are not commingled with the uses by any other process. Serialization normally is required in order to provide consistent results and or a consistent view. Fetch and store accesses to locations in the main storage of a computer system are an important case in which serialization may be required.

As a first example, if process 1 stores the values A and B at locations X and Y, respectively, and process 2 stores the values C and D at locations X and Y, respectively, it may be imperative that the final contents of X and Y are either A and B or C and D but not A and D or C and B.

As a second example, if locations X and Y contain A and B, respectively, and process I stores C and D at X and Y, respectively, and process 2 fetches from locations X and Y, it may be imperative that process 2 fetches either A and B or C and D but not A and D or C and B.

As a third example, if processes 1 and 2 fetch from location Z and, because the fetched values are a predetermined value P, process 1 stores Q at location Z and process 2 stores R at location Z, process 1 may conclude that location Z contains Q while process 2 concludes that Z contains R.

The third example is addressed by U.S. Pat. No. 3,886,525 to Brown et. al., assigned to the same assignee as the present invention. U.S. Pat. No. 3,886,525 discloses a Compare and Swap (CS) instruction. CS has a first operand and a third operand in registers and a second operand in storage at a specified address. CS compares the first operand to the second operand and, if they are equal, stores the third operand at the second-operand location and indicates this result by a condition code 0. If the first and second operands are not equal, CS loads the second operand into the first-operand register and indicates this different result by a condition code 1. CS has the novel feature that, between the time when the second operand is fetched and the time when CS completes by setting condition code 0 or 1, no other instruction, executed by another processor, is allowed to store at or fetch from the second-operand location, this effect being achieved by the locking by CS, in the cache of its processor, the line containing the second-operand location. This novel feature of CS is called an interlocked-update reference.

In the third example, if both processes fetch and store to location Z by means of CS, then only one of the processes will fetch the value P, and only that process will store at location Z.

The CS instruction is not applicable to the first and second examples since X and Y in those examples are two different storage locations which most probably are in different cache lines. Processors cannot each lock two cache lines since this may lead to deadlock. For example, if processor 1 has locked a line containing X and is attempting to lock a line containing Y, processor 2 may have locked a line containing Y and be attempting to lock a line containing X. Now neither processor can proceed.

The first and second examples have been addressed in practice by a programmed lock. A simple programmed lock can be implemented by means of the CS instruction as described for the third example. In that example, the second-operand location can represent a lock, and the predetermined value P can have the meaning that the lock is not currently held. If either process 1 or 2, using CS, replaces P with the third-operand value for the process (Q for 1 or R for 2), then that process has obtained the lock and is allowed, by programming convention, to access the locations X and Y of the first or second example. The other process, by programming convention, is not allowed to access X and Y until it obtains the lock. It cannot obtain the lock until the first process (which may be 1 or 2) has replaced the contents of Z with P.

Now, the problem arises in practice of what a process is to do while it is waiting for the lock represented by location Z. A solution which is practicable in certain cases is for the process to treat the lock as a "spin lock", that is, the process repeatedly executes a CS instruction (spins on the lock) until it obtains the lock. This solution wastes the time of the processor that is executing the process and is only practicable if it can be assured that the lock will not be held for more than a brief time. In the general case, the lock can be held for a very long time because the process holding it may, for example, encounter a page fault when accessing the location X or Y of the first or second example. This will cause the process to be interrupted in order for the control program to resolve the page fault. Since it may take a long time to do that, the control program may undispatch the process and dispatch another process in its place. The control program may even swap out the address space containing the process. Thus, a spin lock is only practicable in practice when it is known there cannot be a page fault and when the processor is disabled for other asynchronous interruptions such as an I/O interruption.

In the general case, the solution to the problem of what to do when a lock is held is to use control program services. For example, a lock can be represented by an event control block (ECB), a process that finds the lock is held can invoke a Wait service specifying the ECB, which will cause the process to be undispatched, and the process holding the lock can release the lock by invoking a Post service specifying the same ECB, which will cause the first process to be placed on a queue of processes eligible to be redispatched. The use of these services can be very time consuming, and it is highly desired that some hardware-assisted method, beyond the simple CS instruction, be available to provide locking in order to serialize the use of resources.

U.S. Pat. No. 5,081,572 to Arnold, assigned to the same assignee as the present invention, discloses Compare and Swap Disjoint (CSD) and Compare and Load (CL) instructions for use as in the first and second examples above. CSD and CL are said to perform interlocked-update references to two locations. In practice, the way of implementing Arnold's interlocked-update references is to quiesce all processors except the one executing the CSD or CL instruction. This is very wasteful of the time of the quiesced processors, and is inefficient.

Another way of replacing a programmed lock is a classification of a subset of computer instructions into a locking class for controlling access to a general type of resource to be protected by use of the instructions in that class. This is disclosed in U.S. Pat. No. 5,333,297 to Lemaire et al (owned by the same assignee as the subject application), and in later filed U.S. Pat. No. 5,488,729 to Vegesna et al. Neither of these patents discloses blocking symbols, which are an essential component of the subject invention. The Lemaire et al patent classifies subsets of computer instructions into locking "classes", each identified by a particular operation code and dedicated to a general type of resource in a computer system, with the type indicated by their instruction operation code. The Vegesna et al patent classifies instructions according to the execution unit which is to execute the instruction, and is a different type of instruction classification than in the Lemaire et al patent. In Lemaire, each instruction class (determined by the operation code) is designed to atomically make data changes in a general type of resource, associated with that instruction class, such as double-threaded queues. A severe restriction on use of the Lemaire instruction-classification invention is that it prevents any other instruction in a locking class from executing on currently unused resources when any instruction is executing in the same locking class on any other processor of the CEC (Central Electronic Complex), comprised of multiple processors. Such locks are provided in each processor's hardware-microcode and not in a centralized hardware-microcode storage area separate from each processor. The lock on a resource is duplicated in each processor's hardware, and inter-processor communications are required to coordinate the state of the lock between these multiple copies of each lock.

The subject invention does not use either interlocked-update references or classes of instructions for accessing resources, and this invention does not suffer from their deficiencies. The resource serialization done by the subject invention does not have the Lemaire restriction of allowing only one of multiple processor's executing Lemaire's instruction classes to access one resource at a time. On the other hand, the subject invention allows multiple processors to simultaneously access plural resources in parallel as long as each of the processors is accessing a different resource using a different blocking symbol, as long as the implementation assigns the symbol a unique lock. The subject invention discovers the use of blocking symbols (not found in any prior art) for identifying resources and controlling their access serialization. The subject invention uses blocking symbols in a new type of instruction to allow the users of a system (e.g. its programmers and programs) to have more precise access control, more resource accessing parallelism, and more resource access granularity than the techniques taught by any known prior art.

The lock classification of instructions (as done in Lemaire et al) binds the association of instruction class to resource type at the time a computer architecture is designed to use such instruction classes. The architectural decisions must be made before a computer design is released for manufacturing a computer. Thus computers built with Lemaire's lock classified instructions may not later be architecturally changed, which may prohibit a software association of locks with later installed resources in a computer system. In most computer installations, new programs are always being developed and many old programs changed, so resources to be serialized will be defined, or changed, over time from program to program. The invention in the subject application enables late software binding of locks to resources of any granularity, usable for controlling the serialized accessing of newly added resources. The locks are chosen and specified to the machine dynamically by the programs, for example. The machine enforces the serialization of operations on the resources represented by the program-specified blocking symbols.

Also, this invention does not require inter-CPU communication broadcasts on inter-processor buses between CPUs on each processor instruction execution initiation to signal to each other processor as is done in Lemaire et al.

SUMMARY OF THE INVENTION

This invention provides a new way for the users of resources in a CEC to control changes to the resources to prevent the changes from affecting the data integrity of the resources. This invention provides a novel type of instruction employing a novel type of interface between a program and a processor which enables users of resources to specify and use blocking symbols for obtaining and controlling a hardware-enforced serialization of user access to the resources, while allowing simultaneous use, including serialized use, of other resources by other processors in the CEC that may use the same type of instruction to access and use the other resources controlled by other blocking symbols.

This invention uses a single execution instance of a single novel type of instruction to lock, change and unlock a resource controlled in a novel manner by a blocking symbol. The resource is in an unlocked state both before and after the single execution instance of this invention. It is important to note that the serialization state of the same resource exists only during any single execution instance for any instruction of this invention. Thus, the resource can be in an unlocked state at all other times.

Where software locking has been employed, the obtaining of a lock and the freeing of the same lock must, necessarily, occur in two separate machine instructions. Between those two instructions, the software performs the computational steps that require the serialization of the resource. This means that software error or processor failure may occur between the obtaining and the freeing of the lock. That is, there are occasions when a lock is held and will not be released, and total system failure may result. To provide system recovery from such untoward occurrences, operating systems generally provide a lock manager service that grants and frees locks, records them while they are in force, and provides recovery by releasing locks held by programs being terminated or restarted, regardless of whether this is caused by software or hardware error. Calling a system service for lock manipulation adds significantly to the program path length of executed machine instructions, particularly in the case of a problem state program, where changes are required, from problem state to supervisor state and back, for both obtaining the lock and freeing it.

This invention provides a method whereby a programmer can associate a user-determined blocking symbol with each resource, or group of resources in which data integrity is to be preserved. All CEC users use the same blocking symbol in all instructions of the subject invention's type written into programs for serializing accesses that make changes in the associated resource. Whenever multiple processors execute instruction instances that simultaneously access the same resource (access to which is controlled by the use of the same blocking symbol in instructions of the type defined by this invention), the multiple processors are serialized in their access to the associated resource, allowing one processor instance at a time to access the resource. As long as the multiple processors are using different blocking symbols during their simultaneous execution instances, no resource conflict exists and they may simultaneously access their required resources.

The particular type of instructions provided by this invention enable its single instance of execution to perform many different types of operating functions, each using a blocking symbol for obtaining serialization protection of resource data integrity. In the embodiments described for this invention, this instruction type is called Perform Locked Operation (PLO) instructions. In the detailed embodiment of this invention, the PLO blocking symbols are called "Program Lock Tokens" (PLTs) to emphasize that software programs select the tokens (blocking symbols). The serialization control of this invention uses hardware-microcode invoked by each instance of execution of the subject instruction type to setup a lock for the resource which is protectively hidden from all software, including the program using the locks. Software programs are not able to view or to control the locks directly. The lock is not part of the program-processor interface. Rather, locks are used internally in an embodiment to effect the required serialization of blocking symbols.

Thus, the hardware-microcode of any processor executing any PLO instruction on any processor serializes all other access requests to the particular resource associated with the blocking symbol by the PLO instruction(s) executing on any other processor(s). The serialization lasts for one instance of execution of the PLO instruction, during which the PLO instruction may make changes at non-contiguous locations, as well as at contiguous locations, in the resource. A PLO instruction may perform multiple store operations to discontinuous storage locations as an atomic operation relative to the other PLO instructions specifying the same blocking symbol executing on other processor.

A resource unit is associated with a blocking symbol and the resource unit may be one or more software or hardware entities of the CEC of conventional type, such as queues, software message buffers, control units, disk drives, etc. A resource unit and the corresponding blocking symbol are specified in each PLO instruction by a blocking symbol associated with the resource.

The same PLO instruction type may have simultaneous instances executing the same or different functions on different processors without conflict, as long as the simultaneous instruction instances have different blocking symbols. But a conflict will exist if plural simultaneous PLO instruction instances executing on different processors have the same blocking symbol, whether or not these PLO instructions have different functions, requiring different changes to the resource being controlled by the blocking symbol.

The locks setup and used by the hardware-microcode of the subject invention may, but need not, have a one-to-one relationship to the resources controlled by the blocking symbols. That is, this invention enables a single lock to be used for either one resource (associated with one blocking symbol), or with plural resources in any number (associated with a corresponding number of blocking symbols). That is, any one lock used by the subject invention may be used by one blocking symbol, or by a plurality of blocking symbols. If one lock is used for multiple resources (respectively associated with multiple blocking symbols), only one of these resources (using an associated one of these blocking symbols) can use the lock at a time. This relationship of one lock to many blocking symbols has the effect of forcing a serialization in the use of all resources associated with the set of multiple blocking symbols controlled by the lock.

Since blocking symbols are specified freely by programmers to serialize program-defined data structures there may be many potentially in use in a modern, high-performance computer system. Over-commitment of the symbols to the physical locks provided by a computing system is a necessary design compromise to handle this situation. The performance effect can be minimized by a sufficient number of locks and a good hashing algorithm.

Consequently, during an allowed PLO instruction's instance of execution, the prevention of access to the resource applies to simultaneously executing PLO instruction instances using the same blocking symbol in other instruction streams, e.g. executing on other processor(s). The PLO serialization of this invention applies only to simultaneous execution of PLO instructions, and this invention does not serialize a resource against accesses being controlled by non-PLO serialization techniques being simultaneously used on a resource (such as software serialization, or another type of microcode-controlled serialization). PLO instructions provide a cooperative serializing function for a program that follows its rules of use. Accordingly, the subject invention must be the only serialization technique used for a resource in all software programs which can access the resource, if the significant advantages of this invention are to be obtained. In other words, all programs accessing a particular resource must exclusively use the PLO instructions of this invention as their only means of forcing access serialization to controlled resources.

However, the subject PLO technique of this invention is compatible with other software serialization techniques on a per resource exclusive basis. This means that other software serialization techniques may be used for other resources in the same CEC to assure their data integrity. That is, the PLO technique can be relied on to maintain the data integrity of a resource only if it is exclusively used for the resource, but other resources not relying on the PLO technique may continue to use another technique to maintain their data integrity. Thus, the subject PLO technique of this invention need not be the only serialization technique used in a CEC. Any resource serialization using a prior software locking technique may continue being serialized by software locks, but PLO instructions cannot be used together with software locking on the same resource since there is no intersection between PLO instructions and software locks. Nevertheless, mixed techniques may be used with a resource (PLO instructions of this invention and another technique) if there is not concern about the integrity of the data in the resource, and then the PLO instructions must not be relied on to maintain data integrity. If the PLO technique is mixed with another serialization technique on any resource, it is the responsibility of the programmer responsible for the mixture to assure that the mixing provides the required data integrity for the resource.

Thus, this invention requires its PLO technique to be exclusively applied on a per resource basis when the integrity of data in the resource is to be assured. Accordingly during each PLO instruction execution instance, all other instances of PLO instruction executing on other processor(s) in the CEC are prevented from accessing the resource associated with the blocking symbol. This PLO blocking symbol controlled manner of resource modification assures the integrity (coherence) of data stored in resources exclusively using PLO instructions for controlling all accessing of the resource.

A protocol is established by programmers to be used in any CEC using PLO instructions in order to assign values to all PLO blocking symbols used in the CEC. A different value is assigned to represent each of the different resource units whose access must be serialized. The protocol may arbitrarily select numerical values as the PLO blocking symbols for the resource units, as long as it selects unique blocking symbols for the resource units, and all software accessing any PLO resource unit uses these unique blocking symbols in all PLO instructions. The resource unit associated with a blocking symbol has the flexibility to include a single computer resource or a plurality of computer resources (e.g. a resource unit may be a single queue, or a plurality of queues), as determined by the software protocol assignment. Hence the resource granularity is determined by the system users. That is, the protocol choices made for assigning resources to blocking symbol values determine the resource granularity handled by the PLO technique. A processor is not aware of the programming meaning of a blocking symbol, nor of the granularity it entails. The blocking symbol designated in each PLO instruction determines what resources are subject to data integrity protection by the PLO instruction and is the resource granularity enforced by the PLO instruction executions. The same blocking symbol must be used in all executions of PLO instructions in a CEC accessing the same resource unit and being capable of modifying data in the resource unit. A processor is not aware of the programming meaning of a blocking symbol, nor the granularity of access it protects. It only serializes on the symbol itself. Hereafter in this specification, the term, resource, may be used to designate a "resource unit" as defined in this paragraph.

Prior software locking methods must know and use the address of the lock field for a resource, e.g. a queue lock field. On the other hand, software using the PLO blocking symbols need not know or use an address of any lock field. The PLO technique does not require its blocking symbols to be stored in any particular place, and there are no software lock fields, or software protocol lock locations. Unlike software locks, blocking symbols do not need to be accessible to the software in a particular location; and this is a major distinction of blocking symbols over prior software locks, which are required to be accessed by software in a protocol location Thus, blocking symbols may have arbitrarily selected values without any address relationship to their associated resources, or some address relationship may be used by a program to determine a blocking symbol protocol.

A significant improvement in system performance is obtained by the exclusive use of PLO instructions in all programs used in a CEC to obtain atomicity of multiple fetch and store operations to complex program data structures. Prior software programs may be rewritten, or recompiled, to entirely replace their use of prior software locks with the PLO instructions of this invention (on the PLO exclusive basis per resource as previously explained herein).

It is also important to realize that the PLO instructions of this invention assure the integrity of data changes at non-contiguous locations in an accessed resource during a single instance of PLO instruction execution. During each single instance of execution of a PLO instruction, the software issuing that PLO instruction is given exclusive control over the associated resource for the changes specified for the duration of the specific PLO instance to be executed for the program. Exclusive control over a resource for a PLO instance may start when the processor finds no contention for the resource by finding the available state indicated by the hardware-microcode (H-M) lock for the designated blocking symbol in a central H-M storage area, and if no conflict exists exclusive changes are allowed to be made in the resource as specified by that PLO instruction, after which the execution instance ends. Accordingly, any contention is detected after the start of the instance, and the instance may continue in a waiting state until the end of contention is indicated, then the instance performs its exclusive specified changes to the resource, and finally the instance ends.

An important advantage in using the PLO instructions of this invention is the very short duration of each lockout to a resource enforced against other PLO execution instances. Each lockout exists for only the single instance of PLO instruction execution when serialization may occur. As soon as one PLO instance completes, the resource is available for being changed by another PLO instance, so that very rapid switching may occur from one PLO instruction execution to the next PLO instruction execution. This is not possible with software locks, which must retain a single locked state over a large number (e.g. hundreds) of instances of instruction executions, as compared to this invention which retains the locked state for only one instance of an instruction execution on the resource controlled by the specified blocking symbol.

It is also important to understand that the subject PLO instructions of this invention may be non-privileged instructions. Then, such PLO instructions can be executed from within non-privileged programs, which avoids the high system overhead of having to switch processor control to a supervisory program to execute the instruction. By comparison, prior software locking often was done by locking control programs executed in supervisor state (using a large number of instructions). To change a system resource, prior non-supervisory programs had to cause switching of processor control to the supervisory program which could change the resource or grant the access lock. The supervisory program accessed the lock location (such as in a queue anchor), atomically tested its lock state, acquired the lock state if it found an unlocked state, then changed the resource, or just granted the lock. And finally, the supervisory program passed the processor control back to the requesting non-privileged program so that the non-privileged program could continue from where it left off (at its point of calling the supervisor service). On the other hand, the subject invention can avoid this complex prior-art scenario by instead using a single instance of PLO instruction execution.

The protocol determination of blocking symbols to resources is made at the software level for the PLO instructions without constraint by the hardware-microcode used by any processor. The blocking symbols may be selected either by arbitrary human assignment (e.g. assigning blocking symbols, each different from the other), or by use of a predetermined algorithm. The blocking symbols are assigned to the resources before the symbols are designated in software PLO instructions, and therefore before the symbols are ever used by any processor. The software therefore knows which blocking symbol associates with which resource, and also knows the location of the resource, since the software provides the operands for accessing the resource in each of its PLO instructions.

Each of the embodiments described for this invention provides a microcode shared area in protected storage used by all processors executing PLO instructions in a CEC. This microcode shared area is transparent to software programs, because this storage area is protected from, and is not addressable by, the software programs using the PLO instructions. PLO lock fields in the shared microcode area enable coordination of plural processors using the same blocking symbol in simultaneously executing PLO instructions, regardless of how many processors are simultaneously executing the PLO instructions.

In the preferred embodiment method of operation, the entire processing for any PLO instruction is done by each of the processors executing software containing PLO instructions. The microcode shared area in the CEC protected storage contains the microcode needed to support PLO instruction execution, and the lock fields in the protected storage are accessed and used by all processors executing the PLO instruction instances in the CEC. By using the principles taught in this specification, one skilled in the art is expected to be able to devise embodiments in which hashing and lock manipulation are performed as hardware functions.

The embodiments described in this specification have one or more processors perform a well-known hashing type of operation on PLO blocking symbols by each processor using hardware-microcode (H-M) located in a CEC protected storage containing a table of PLO lock entries. The protected storage is accessible only to hardware/microcode, and cannot be addressed by software instructions. Each PLO lock entry (PLO entry) is associated with one or more resource units designated by one or more blocking symbols usable in PLO instructions executing in the CEC. The size of each of these PLO locking entries may be as small as a single bit (which may be called an L bit field) settable to either of two states—an available (unlocked) state and a locked state.

The PLO blocking symbol is extracted by the processor executing a PLO instruction when a PLO instruction execution instance is invoked, and then the blocking symbol is converted to an H-M lock field address in the centralized protected storage.

In the preferred embodiment, each processor performs all of the H-M processing required in the execution of each PLO instruction instance on a processor. When the processor completes its generation of the hashing result for the blocking symbol in a currently executing PLO instruction, the processor must obtain the lock in the located PLO entry before that PLO executing instance is allowed to make any changes in the associated resource.

The preferred embodiment of the invention described herein has the hardware-microcode of the executing processor associate one or more blocking symbols with a corresponding PLO lock entry (the lock entry is associated with each resource controlled by each of these software-protocol-defined blocking symbols that locate the same lock). This association enables this PLO entry in protected storage to perform the data coherence locking function for each associated resource. The PLO association between each blocking symbol and one of the PLO entries is implemented in the preferred embodiment of this specification by a predetermined hashing operation performed by the H-M of the requesting processor on the blocking symbol. The H-M hashing operation (which is not apparent to the executing software) may use any hashing algorithm that provides a hashing result for each of the possible assigned PLO blocking symbols. For example, the hashing operation may use a subset of pre-selected bit positions in the blocking symbol, and apply arithmetic and/or exclusive-or functions to the values of these bits to generate the required hashing result. The hashing result for each of the blocking symbols locates a different PLO entry in the H-M area. Some hashing algorithms may include a table for translating the hashing results to the storage locations of the associated PLO entries in the centralized H-M area.

The number of blocking symbols may be much larger than the number of locks, since plural blocking symbols may hash to the same lock; so that some of the blocking symbols will have the same hashing result and locate the same lock. No coherence problem is caused by multiple blocking symbols hashing to the same lock, but this could cause a reduction in system performance. This is because if one lock is accessed by using one hashing result which may be obtained by hashing any of a set of multiple blocking symbols representing multiple resources, there may be accidental conflict in use of the same physical lock; and then only one of these multiple resources can be locked and be serially accessed at the same time. Therefore a CEC may have any number of locks and have any number of blocking symbols without a one-for-one relationship between them. Experience will teach the hardware-microcode designer to choose an optimum number of locks and the best hashing algorithms for the computing environments in which his machines will be used.

Since each unique blocking symbol will always hash to the same PLO lock entry for all processors, it is unnecessary to store the blocking symbol in the PLO entries. By having each of the processors perform the H-M processing for each PLO instruction instance, including obtaining the required H-M lock and then releasing it, it is unnecessary to store the processor identifier of the executing processor in the PLO entry. Thus in the preferred embodiment, it is optional whether to store in each PLO entry the blocking symbol and/or the processor identifier (PID) of the processor attempting to access by means of the PLO entry. Each PLO entry in the centralized protected H-M storage has at least an L field which, when set off, indicates the available state for the respective PLO entry, and when set on indicates the locked state for the associated resource allowing exclusive access to the resource by the processor executing the current PLO instruction.

When one of plural executing processors uses its generated hashing result to locate the required PLO entry, that processor must compete for the lock field in the located PLO entry with any other processor simultaneously executing any PLO instruction instance using the same blocking symbol or another symbol that hashes to the same H-M lock. The multiple processor competition requires an atomic testing and setting of the lock field in the accessed PLO entry.

Thus, the atomic operation for getting the lock field in a located PLO entry determines which of competing processors gets to exclusively access the resource associated with its blocking symbol. The atomic operation resolves the conflict ambiguity among plural simultaneous PLO requests using the same blocking symbol, and avoids potential simultaneous damage to the data integrity of the resource. If no atomic operation were used, contending processors could concurrently test the L bit, both processors could find it in available state, and then both processors may simultaneously set the L bit with the result that each of the processors would presume it was selected to access the associated resource, enabling both procesors to simultaneously store changes in the resource, which would violate the coherence rule that only one processor at a time is allowed to change the resource. The coherence problem of this example is solved by requiring the atomic compare-and-swap (CS) operation of the prior art. Alternatively, the test and set instruction found in prior art could also be used for each executing PLO instruction instance to obtain the protected H-M lock. Thus, atomic CS operations by competing processors are used for determining which processor will be the next processor to have exclusive access to the associated resource when more than one processor contends for a lock simultaneously.

The atomic operation determines which processor is the next processor to complete its instance of PLO execution on the resource associated with the located PLO entry. If there is no competing processor, the sole requesting processor gets to complete its PLO instance. If there are competing processors, they concurrently may test the state of the L field. During the test by any processor, it may find the L field in either an available or a locked state. If the L field is found in an available state, the atomic operation allows only that one of the processors to set the L field to the locked state, and that processor is thereby selected to complete its instance of PLO execution and it proceeds with the PLO execution. Any other processor testing the lock field sees the locked state, which prevents it from proceeding with the remainder of the PLO execution. Any processor finding the L field in a locked state is not selected by the atomic operation, and that processor may either 1) end its PLO execution instance and report this back to the program, or 2) enter a delay loop during which it continues to atomically test the L field until it finds it in the available state. Then, that processor has exclusive access to the associated resource and is permitted to complete its instance of PLO execution. Thus a ny processor executing a PLO instance may be delayed from getting exclusive access to the associated resource until the L state of the PLO entry is reset to the available state upon completion of a prior PLO instance executing on a different processor, and the n the requesting processor obtains the exclusive modifying rights to the resource and can complete its PLO instance.

When multiple PLO entries exist in the H-M area, multiple processors may be simultaneously executing PLO instruction instances using different blocking symbols to access different PLO entries for enabling the processors to simultaneously access the different resources. However, if multiple processors attempt to execute PLO instruction instances using the same blocking symbol, they will hash to the same PLO entry for the same resource, and they will be serialized, so that only one at a time of the requesting PLO instructions is allowed to have exclusive access rights to access the associated resource.

In summary, the lock field L in a PLO entry is atomically tested by the H-M of each processor executing a PLO instruction, and only one processor at a time is allowed to set the lock bit L to its locked state to give the setting processor the current exclusive right to change the associated resource. At the completion of each PLO instance the L field is set to the available state, and thereafter the first processor finding the L field in the available state is atomically allowed to set the L field to the locked state, and that processor is given the exclusive right to change the associated resource for completing its execution instance, and any other competing processors may delay the completion of their PLO instance or quit their PLO instance. Thus, the atomic compare-and-swap operation by any processor occurs during the initial part of each PLO instance of execution, which may be loop delayed until that processor is atomically enabled to set the locked state of the L field and complete its PLO instruction execution instance.

PLO conflicts are rarely expected, and they will extend the time of a conflicting PLOs instance, but the expected rare delays should not have much effect on the average length of the PLO execution instances, which should remain very short in duration.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

DESCRIPTION OF THE DETAILED EMBODIMENT

Figure 1:
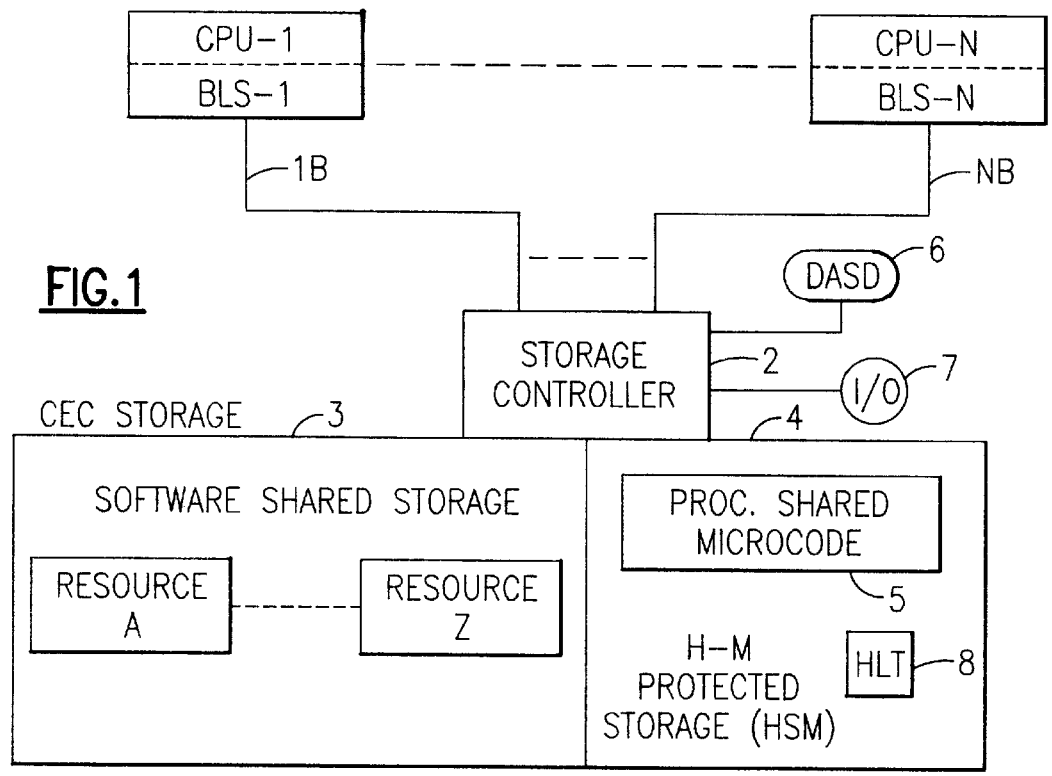
FIG. 1 represents a computer system containing a preferred embodiment of the invention.

FIG. 1 illustrates the pertinent part of a computer system (CEC) containing a preferred embodiment of the invention. This CEC contains a plurality of central processors (e.g. CPUs) 1 through N which are each separately connected to software shared storage 3 by data and control buses 1B through NB. Each of the processors in the CEC comprises hardware and microcode (H-M) which performs each of the instructions executable by the processor. Each of the processors may be fabricated on a single semiconductor chip, or a plurality of processors may be fabricated on a single semiconductor chip, or a single processor may be fabricated with a plurality of semiconductor chips. An example of the CEC may be the IBM S/390 system, of which there are many different models having from one to ten processors.

This invention is applied to a CEC having more than one processor, since the subject invention deals with conflicts among plural processors simultaneously attempting to access the same resource in a shared storage 3. However, the invention will function correctly in a CEC having a single processor and storage containing the subject invention.

A CEC storage is used by all of the processors 1–N, and it may be the system main storage, or it may be a shared hardware cache of the type sometimes called a second level or L2 cache which is connected to the CEC storage. This CEC storage is constructed from the DRAMS (dynamic random access memory) chips. The storage receives and stores its contents from/to DASD (direct access devices) 6 and I/O (input/output) devices 7. The CEC storage is accessed by the processors 1–N through a storage controller 2.

In this embodiment, the CEC storage is divided into two sections: a software shared storage 3 for containing software programs and data, and a protected storage 4 for containing only H-M information used by processors 1–N. The software storage 3 is the well-known main computer memory containing instructions and data used by all software programs in a computer system, and contains well-known types of software resources A through Z, which comprise programs, queues, buffers, etc. that are software structures needed to enable the operations in any complex computer system. In this CEC, these resources are sharable among the users of the CEC. Users of the CEC include programs of any type executing in the CEC, and comprehend the human owners of those programs, including programmers.

Both the software storage 3 and the protected storage 4 are accessed by addresses sent to storage controller 2 by any of processors 1–N for accessing in both storages 3 and 4.

In the preferred embodiment, protected storage 4 is the well-known HSA (hardware system area) found in each of the IBM S/390 CECs, which is a protected section in the same set of DRAMs also containing storage 3, but having different absolute address locations. Both of storages 3 and 4 are accessed by using the same buses 1B–NB to controller 2. Accessing protection is obtained for H-M storage 4 by using special absolute addresses sent to controller 2; these special addresses identify the H-M storage 4 as the location of the address. Software programs have no capability of accessing or using these special absolute addresses for software storage addresses.

This invention also applies to partitioned CECs. A CEC may have its hardware and software resources divided into independent operating partitions, in which each partition comprises an exclusive subset of the CEC hardware and software and contains an operating system, such as a copy of the IBM MVS (multiple virtual storage) operating system and/or the VM (virtual machine) CMS (conversational monitor system) control program. One operating system is provided in each partition. Each of these operating systems can only access the subset of resources in its partition, and cannot access resources in any other partition.

In a partitioned CEC, each partition has its own shared memory 3 separate and independent from the shared memory 3 of any other partition in the CEC. The operating system in a partition can only access the shared memory 3 in its respective partition. The software storage 3 of each partition therefore has its own set of resources A–Z, which may be different from, and unrelated to, the resources A–Z in any other partition.

Only one protected storage 4 is required for all partitions, since the protected storage 4 is not available to accessing by the software operating systems or by programs operating under under them in the partitions. Each processor of a partitioned CEC can access the software storages 3 in all partitions, so that each of the processors of a CEC may be shared among its partitions. However, one or more of the processors may be dedicated to any partition. The sharing of processors poses no data integrity problem, since a processor is restricted in its accesses to one portion of storage assigned to the partition it is currently serving.

The proceeding paragraphs describe prior art features and characteristics which may be found in the preferred embodiment in which the subject invention is described below:

Each of the processors 1–N detects the operation code in each instruction it is executing, uses H-M in the conventional manner to detect the operation code for the instruction, and uses H-M in the conventional manner to execute the instruction. Thus, each PLO instruction is detected by any of processors 1–N in an executing instruction stream of a software program in the conventional manner.

In FIG. 1 a processor shared microcode area 5 is illustrated in the protected storage 4 for storing microcode accessed and used by the processors, including the processors handling PLO blocking symbols, i.e. processors 1–N. Shared microcode area 5 includes a microcoded algorithm for controlling the processor to perform a hashing function used for hashing the blocking symbol, BLS, accessed in the currently invoked PLO instruction. Any of the processors may at any time be processing a blocking symbol, BLS, during a PLO instruction execution instance. In FIG. 1, BLS-1 represents any blocking symbol being processed by processor-1, through blocking symbol BLS-N representing a blocking symbol being processed by processor-N in a current PLO instruction execution instance. Of course any processor currently executing any other instruction than a PLO instruction will not be processing any BLS.

Figure 2:
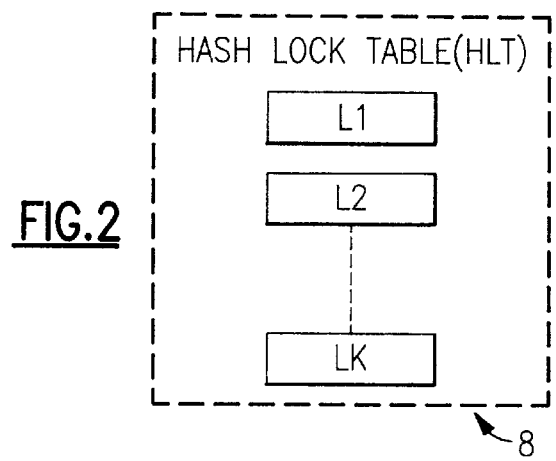
FIG. 2 represents a set of lock fields in the hash table shown in FIG. 1.

Any processor currently executing a PLO instruction instance will be accessing read-only microcode in the processor shared microcode area 5 located in the H-M protected storage 4 in FIG. 1. Area 5 includes microcode for controlling any processor required to perform any of the different functions for any PLO instruction execution instance. Area 5 also includes a hashing algorithm for controlling the processor for generating the hashing result from the current blocking symbol. Hashing algorithms are well-known in the prior art. The hashing processing for this invention may optionally include redirection tables (not shown) for translating the hashing result to an associated PLO entry location in the process of generating an absolute address for the associated PLO entry, or the hashing result may be used as a simple index to the address of a table of PLO entries. The PLO entries are shown in FIG. 2 in a hash lock table (HLT) 8, which contains all PLO locks currently being used by any blocking symbols obtained by any of processors 1–N. The HLT 8 (shown in FIG. 2) contains PLO lock entries L1–Lk, each of which contains a lock bit L.

Figure 3:
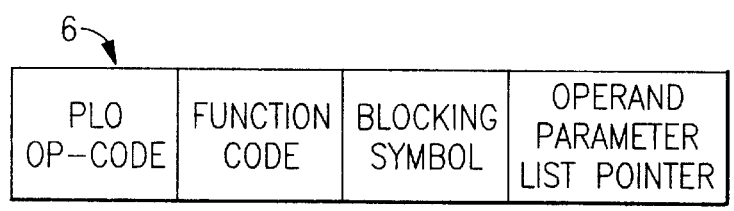
FIG. 3 is a general representation of an instruction for invoking the method of the subject invention.

FIG. 3 shows the format of each PLO instruction invoked from an executing software program by any of processors 1–N. The illustrated format for each PLO instruction contains the following fields: an operation code field, a blocking symbol field (containing a blocking symbol, or an address for locating a blocking symbol), a function code field (FC) for containing the particular function code for controlling how the PLO instruction is to be performed (such as a Compare and Swap function, a Compare and Swap Double function, a Compare and Swap Triple function, etc.), and an operand parameter field for containing a pointer to a parameter list that contains all other operands needed to execute the function specified in the PLO instruction. Optionally, the operand parameter list may also contain either the blocking symbol operand or the FC operand, or both of them; if this option is used then the parameters in the parameter list will not be provided in fields directly located in the PLO instruction format as shown in FIG. 3.

Figure 4:
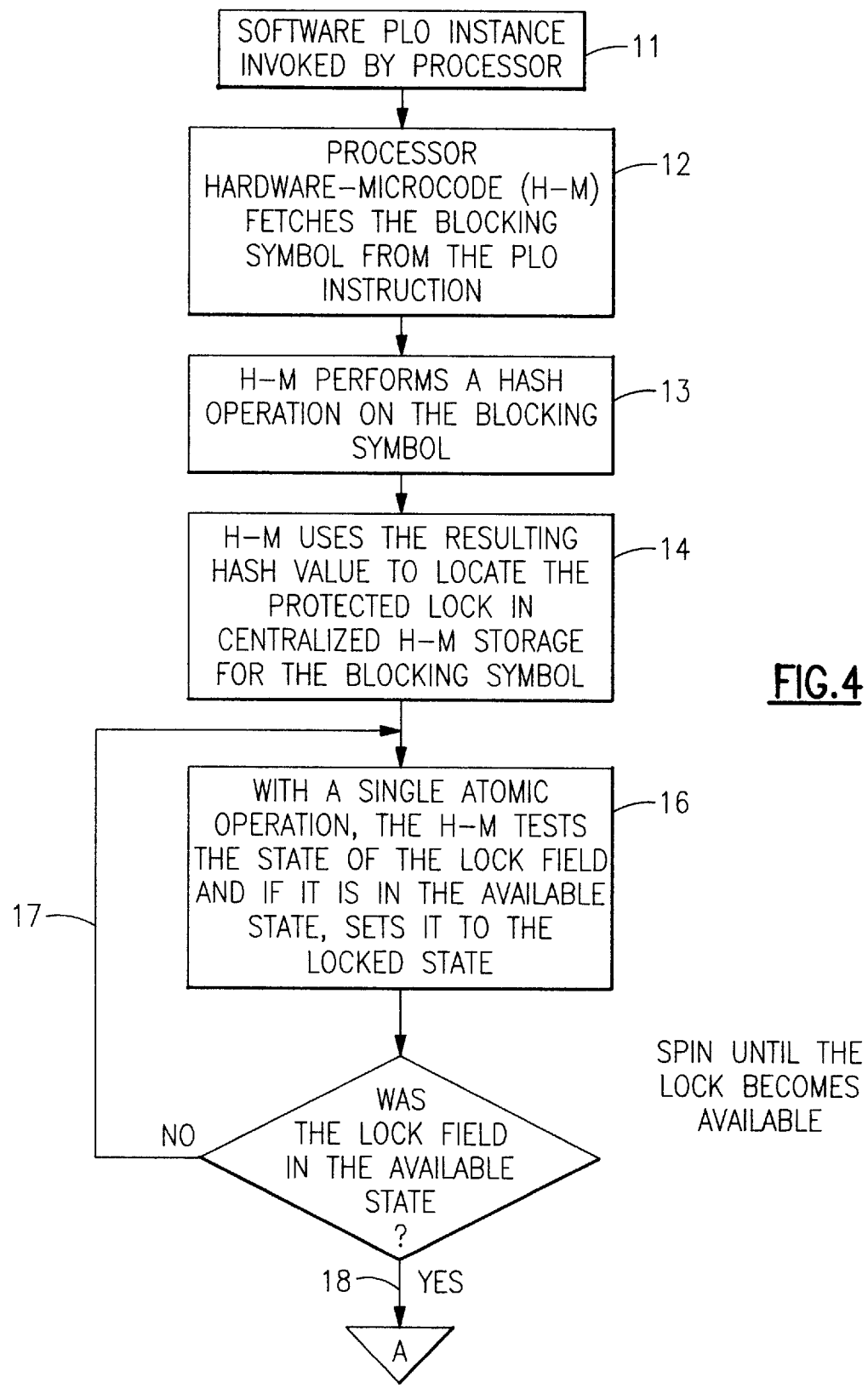
FIGS. 4 and 5 comprise a flow diagram of a preferred method of operation of hardware-microcode of any of plural processors containing the subject invention, for which conflicting PLO instruction instances are delayed until a required resource is available so that each of the conflicting instances can successfully complete its operation.
Figure 5:
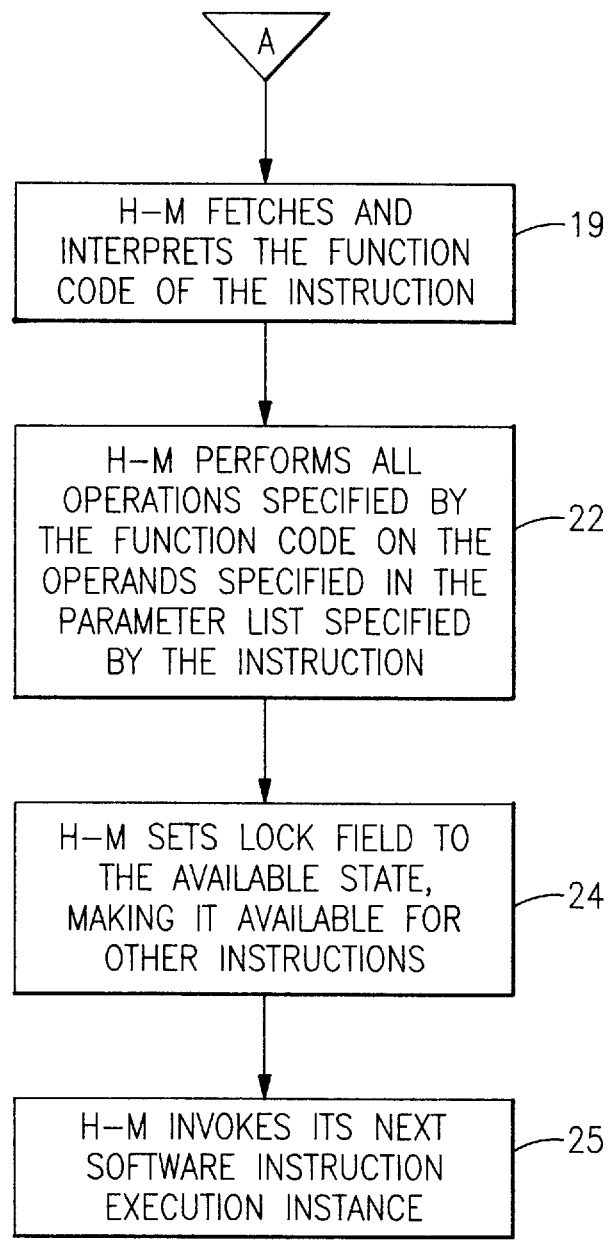

FIGS. 4 and 5 represent a preferred embodiment of a PLO process using steps 11 through 25 which are executed by any of processors 1–N to execute each PLO instruction invoked by the software program. Each invoked PLO instruction is handled by the process as a request for obtaining the associated lock in the hash lock table 8 in FIG. 2 before the storage accesses specified by the instruction's function code are performed. It is to be noted that in this embodiment all processing of the PLO instructions, blocking symbols, hashing, and lock fields in table 8 is done by the processor executing the current PLO instruction. That is, in this embodiment the same processor performs all of the steps 11 through 25 in FIGS. 4 and 5.

Step 11 represents using the processor's instruction counter setting to access a PLO instruction which then becomes the current instruction in a software program being executed. Upon invoking the current instruction execution instance in step 11, the processor detects the operation code in that instruction and detects that it requires PLO operations to be performed by the processor. Then step 12 represents the processor accessing the current blocking symbol in the current PLO instruction, or at a location in an operand of that PLO instruction, as indicated by the operation code of this PLO instruction. In the next step 13, the processor performs a hashing operation on the current blocking symbol using the microcoded hashing algorithm stored in the processor shared microcode area 5. A hash result is obtained by the processor from the hashing operation from which an absolute address is obtained at step 14 for locating an associated PLO lock entry in HLT 8 in protected storage 4.

The current PLO instruction execution instance is requesting exclusive access to a resource represented by the current blocking symbol. Hence the current PLO instance is a requesting PLO instruction execution instance at this time.

Figure 6:
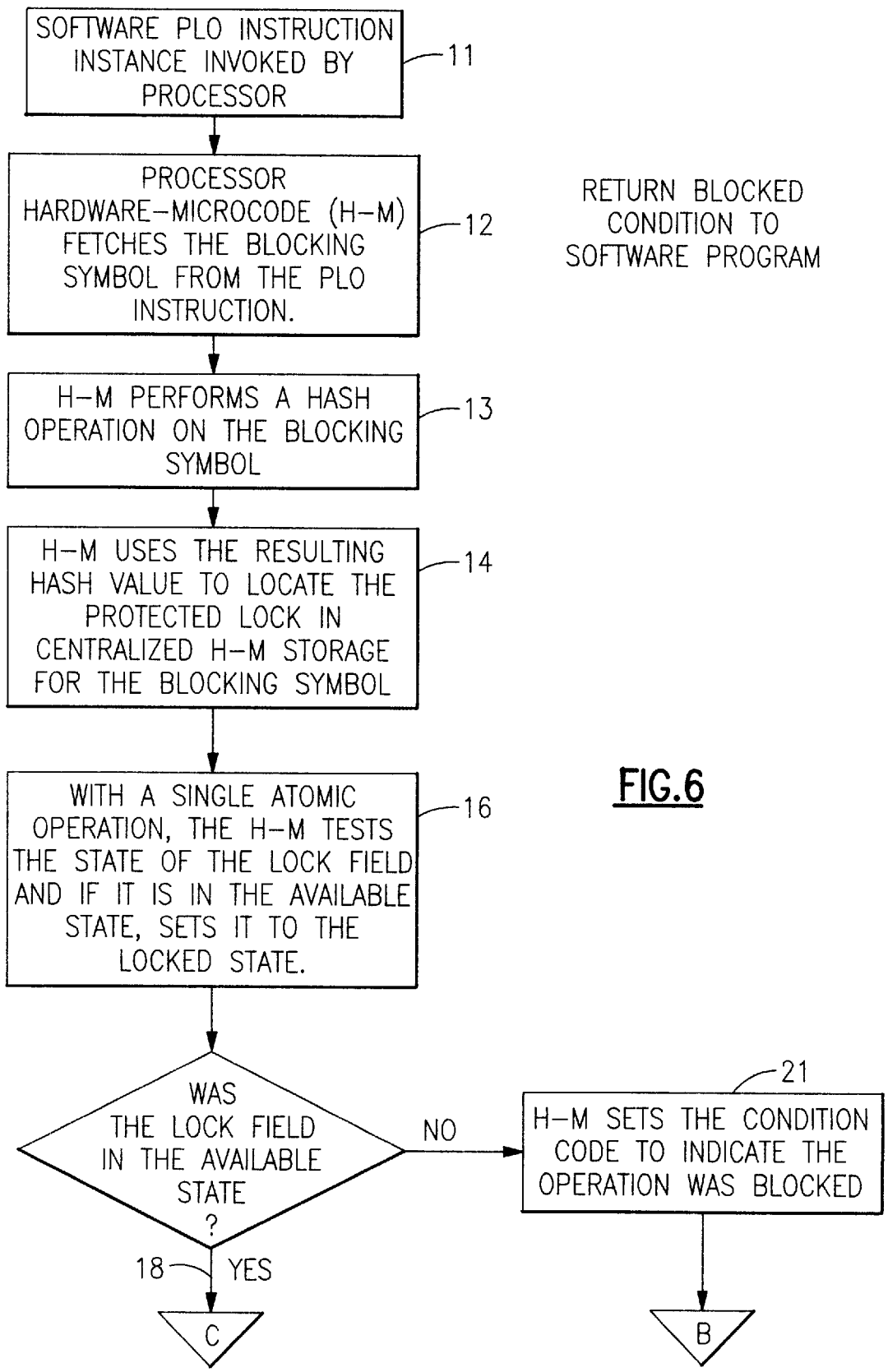
FIGS. 6 and 7 comprise a flow diagram of an alternative method of operation of hardware-microcode of any of plural processors containing the subject invention, for which any conflicting PLO instruction instance is ended without successful completion due to a required resource being exclusively used by another PLO instruction instance, and the ended PLO instruction instance may later be repeated by its program in a later instruction instance when a required resource is available.
Figure 7:
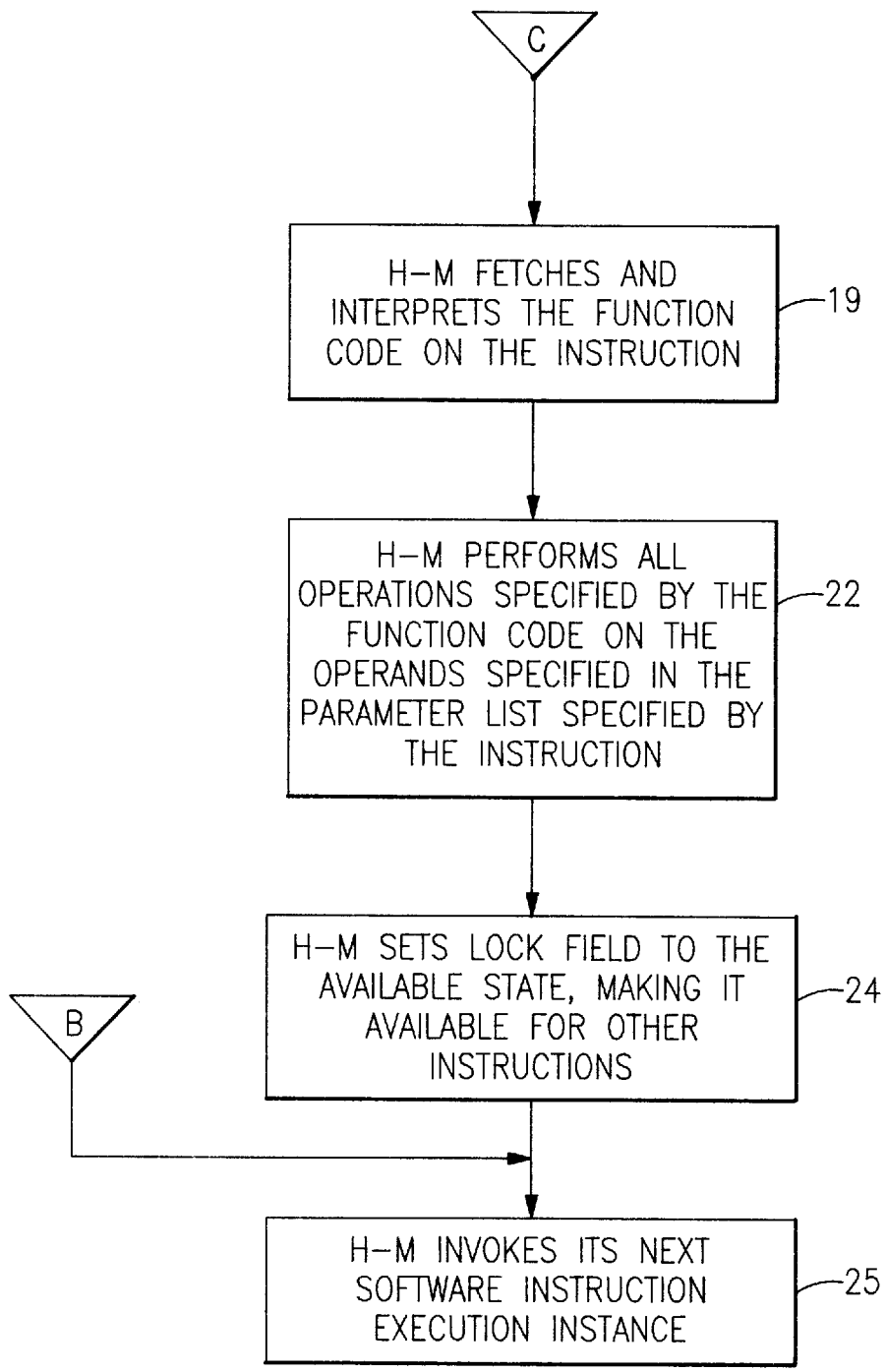

The obtained absolute address for the requesting PLO execution instruction instance is used to locate the PLO lock entry associated with the blocking symbol being currently processed, and the addressed lock bit L in the PLO entry is accessed for step 16. A test operation is started on the L bit to determine if L indicates the available state or the locked state for the resource associated with the current blocking symbol. If L indicates the locked state, that resource is currently under the control of another processor, or another blocking symbol has been hashed to the same lock entry, so that the processor currently executing the PLO process for the requesting PLO instance cannot then access the resource. The PLO process for the requesting processor has either:

1) the method shown in the preferred embodiment in FIGS. 4 and 5 which delays the current PLO instance by using a branch back 17 to the beginning of step 16 for spin looping through multiple executions of step 16 until the L bit is found in the available state, or 2) the alternative method shown in FIGS. 6 and 7 in which the current PLO instruction instance is ended at step 21 without performing the function defined by the instruction instance. Step 21 generates a condition code to report back to the processor program the failed instruction instance, as indicated by the condition code, so that the processor can initiate its next instruction instance. With option 2) the program may later re-execute this PLO instruction for another instance in the hope of finding L in an available state. Except for the option 1) and 2) difference, FIGS. 6 and 7 contain the same steps as shown in FIGS. 4 and 5.

Step 16 requires an atomic operation for testing L and setting L to the locked state for a requesting PLO instruction whenever L is found in an available state. During the atomic operation, only one requesting processor is allowed to test and change the state of the accessed L field. Atomic operations are well known in the art, and for example may be done by allowing one processor to have exclusive control of the storage containing the L bit.

Step 19 is entered when the associated L field is set to a locked state by the requesting processor. Step 19 accesses and interprets the FC operand in the current PLO instruction to determine the function to be performed on the associated resource during that instruction execution instance. Then step 22 accesses the resource associated with the current blocking symbol, and now the current execution instance has exclusive rights to make changes in the resource.

Next step 23 then performs all operations on the resource required by the function code in the current PLO instruction using the operands in the parameter list pointed to in the current PLO instruction and the processor may then make any changes in the resource required to carry out the operations specified for the current FC.

When the processor has performed all operations required by the FC, step 24 sets the L field to its available state to unlock the resource, so that the associated resource can then be accessed exclusively by another PLO execution instance. The execution for the current PLO instruction instance is now completed and ended.

Finally, step 25 is performed in which the current processor increments its instruction counter to its next instruction address to initiate its next software instruction execution instance.

While we have described our preferred embodiments of our invention, it will be understood that those skilled in the art, both now and in the future, may make various improvements and enhancements which fall within the scope of the claims, which follow. These claims should be construed to maintain the proper protection for the invention first disclosed herein.

Having thus described our invention, what we claim as new and desire to secure by Letters Patent is:

1. A method of protecting the integrity of resources in a computer system from simultaneous access attempts by multiple instruction execution instances on different processors, the method comprising the steps of:

software associating a blocking symbol with a computer resource in a computer system, locating the blocking symbol as an operand of a special-type of resource lock instruction (PLO), and locating other operands in each special-type of resource lock instruction for specifying places in an associated resource to be accessed or changed by an executing instance for a PLO instruction, exclusively executing an instruction instance specifying a blocking symbol for the special-type of resource lock instruction in all programs making changes to the resource associated with the blocking symbol, accessing a protected storage during execution of each special-type of resource lock instruction to locate a lock field associated with the blocking symbol utilized by the PLO instruction instance, testing the state of an accessed lock field to determine if the resource associated with the lock field is in an available state indicating the resource can be used or is in a locked state indicating the resource cannot be used by the program atomically with the testing step setting the lock field to the locked state to prevent any changing of the resource by a concurrent instruction execution instance of another processor in the computer system, if the testing step found the lock field in an available state, and exclusively accessing locations anywhere in the resource, and processing contents of the locations as specified in the special-type of resource lock instruction during the instruction execution instance while the lock field is set to the locked state, and resetting the lock field to the available state when the processing during the instruction execution instance is completed.

2. A method of protecting the integrity of resources in a computer system from simultaneous access attempts by multiple instruction execution instances of different processors, as defined in claim 1, the step of exclusive accessing locations further comprising the step of:

locating and processing the contents of non-contiguous locations in a software resource in a storage of the computer system.

3. A method of protecting the integrity of resources in a computer system from simultaneous access attempts by multiple instruction execution instances on different processors, as defined in claim 1, the method further comprising the step of:

delaying any changing of the resource during the instruction execution instance until a lock field is tested and found in the available state.

4. A method of protecting the integrity of computer resources from simultaneous access attempts by multiple instruction execution instances on different processors, as defined in claim 1, each processor performing the method further comprising the steps of:

performing the lock testing step by the processor executing a hardware-microcode sub-process, and looping in the sub-process if the lock field is found in the locked state for delaying any changing of the resource during the instruction execution instance until after the lock field is found in the available state.

5. A method of protecting the integrity of computer resources from simultaneous access attempts by multiple instruction execution instances on different processors, as defined in claim 3, each processor performing the method further comprising the step of:

terminating the instruction execution instance if the lock field is tested and found in the locked state.

6. A method of protecting the integrity of computer resources from simultaneous access attempts by multiple instruction execution instances on different processors, as defined in claim 3, the associating step further comprising:

performing a hashing operation on the blocking symbol for generating an address for locating the lock field in the protected storage.

7. A method of protecting the integrity of computer resources from simultaneous access attempts by multiple instruction execution instances on different processors, as defined in claim 6, the associating step further comprising:

locating hashing microcode in a location accessible to each processor capable of executing the hashing operation for the special type of resource lock instruction.

8. A method of protecting the integrity of computer resources from simultaneous access attempts by multiple instruction execution instances on different processors, as defined in claim 7, the associating step further comprising:

associating each blocking symbol with a computer resource, assigning each lock field to one or more blocking symbol(s), and hashing each of the one or more of the blocking symbols to the lock field during one instruction execution instance when any of the one or more blocking symbols is used by the special type of resource lock instruction.

9. A method of protecting the integrity of resources accessible by instances of execution of instructions in software programs executing on plural processors in a computer system, each processor performing the method comprising the steps of:

accessing by the processor of an instruction in a software program to invoke the start of an execution instance for the instruction, determining from an operation code in the instruction if a special request is being made for exclusive access to a resource in the computer system during the execution instance, obtaining a blocking symbol from an operand of the instruction if the determining step determined a blocking symbol is being used by the instruction, performing a hashing operation on the blocking symbol for generating a location of a lock field in a protected storage in the computer system, the lock being associated with the resource to which exclusive access is being requested by the instruction, the lock field being associated with the blocking symbol by the hashing operation, testing the lock field accessed by the performing step for an available state or a locked state, atomically with the testing step setting the lock field to the locked state if the testing step finds the lock field in the available state, wherein all other processors in the computer system are inhibited from attempting to access the lock field while the processor is testing and setting the lock field, enabling exclusive access to the resource by the processor setting the lock field, executing by the processor on the resource during the remainder of the execution instance all accesses to non-contiguous storage locations required by the function code for the instruction, resetting the lock field to the available state, and invoking by the processor execution of a next instruction.

10. A method of protecting the integrity of resources by the process defined in claim 9, the testing step finding the locked state for the lock field, the processor performing steps of:

repeating the testing step until an unlocked (available) state is determined for the lock bit, and atomically with the testing step setting the lock field to the locked state when the testing step finds the lock field in the available state, wherein all other processors in the computer system are inhibited from attempting to access the lock field while the processor is testing and setting the lock field, enabling exclusive access to the resource by the processor setting the lock field, performing by the processor on the resource during the remainder of the execution instance all operations required by the function code for the instruction, resetting the lock field to the available state, and invoking by the processor execution of a next instruction.

11. A method of protecting the integrity of resources by the process defined in claim 10, the testing step finding the locked state for the lock field, the processor also performing the step of:

ending the execution instance if the testing step determines the lock bit is in the locked state indicating the resource associated with the lock field cannot be exclusively accessed by the processor.

12. A method of protecting the integrity of resources by the process defined in claim 11, the software program performing the step of:

re-invoking the instruction for another execution instance after termination of the execution instance.

13. A method of protecting the integrity of resources accessible by execution of instructions in software programs executing on plural processors in a computer system, comprising the following steps:

installing on the computer system software programs containing Performing Lock Operation (PLO) instructions in which each PLO instruction has a blocking symbol operand used for controlling access to an associated resource in the computer system, assigning by a programmer for the computer system a unique blocking symbol for each resource unit to be changed only by execution of PLO instructions, providing by the software programs operands in each PLO instruction for changing the resource unit assigned to the blocking symbol, executing software programs by a plurality of processors in the computer system containing PLO instructions for accessing the resource units associated with blocking symbols, exclusively using PLO instructions for controlling all accesses attempts by the processors to reference one of the resource units assigned an associated blocking symbol, and using the same blocking symbol by all PLO instructions attempting to access the same resource unit, constructing one or more lock fields in a protected storage location in the computer system, the lock fields being accessible to all processors of the computer system executing PLO instructions, obtaining by the processor a lock field for the blocking symbol in an executing PLO instruction, testing the state of the lock field, and atomically with the testing obtaining the lock by setting the lock field to locked state if the lock field is tested in an available state, accessing and changing the resource by the processor while the lock field is set to a locked state, and setting the lock field to an available state after the processor has completed executing the PLO instruction instance.

14. A method of protecting the integrity of data stored in a computer system when the data is accessible by execution of software instructions in programs executing on plural processors in the computer system, comprising the steps of:

specifying by a software program a blocking symbol (BS) in a BS instruction, the blocking symbol uniquely associated with a resource, the blocking symbol being in a location addressable by software, associating a hardware/microcoded lock with the blocking symbol, locating the hardware/microcoded lock at a protected location accessible to a processor executing the BS instruction, and the protected location of the lock not being accessible at addresses specified by software, executing the BS instruction during a BS instruction instance by a processor in the computer system, accessing the hardware/microcoded lock utilizing the BS and setting the lock to lock state if the lock is found in an unlocked state to enable the processor to obtain the lock near the beginning of the BS instruction instance, serializing an execution attempt by any other processor concurrently attempting to execute an instance of a BS instruction using the same blocking symbol to allow only one (BS) instruction instance at a time to obtain the lock and complete execution of the BS instance by changing any number of location in the resource while holding the lock, unlocking the lock at the end of each instance of BS instruction execution in which the lock is held to always leave the lock in the unlocked state at the completion of each BS instruction instance that changes a resource.

15. A method of protecting the integrity of data stored in a computer system when the data is changeable by execution of software instructions in programs executing on plural processors in the computer system, as defined in claim 14, further comprising the step of:

changing any number of non-contiguous locations in the resource associated with the blocking symbol during execution of the (BS) instruction instance while holding the lock.

16. A method of protecting the integrity of data stored in a computer system when the data is changeable by execution of software instructions in programs executing on plural processors in the computer system, as defined in claim 15, further comprising the steps of:

associating with the blocking symbol a control field in a protected storage of the computer system, setting the control field to a locked state when beginning execution of an allowed special instruction instance having the blocking symbol, and resetting the control field to an available state at end of the instance of execution, and while the control field is set to the locked state enabling the allowed special instruction instance to exclusively access a resource at non-contiguous locations specified in one or more operands of the allowed special instruction instance.

17. A method of protecting the integrity of data stored in a computer system when the data is changeable by execution of software instructions in programs executing on plural processors in the computer system, as defined in claim 16, further comprising the steps of:

operating hardware-microcode internal controls of each processor for gaining control over the control field, utilizing the hardware-microcode internal controls of each processor to atomically gain control over the state of the control field in the protected storage location by a hardware-enforced atomic operation which allows only one of the processors simultaneously executing special instruction instances to obtain control over the control field at a time, completing execution for an allowed special instruction instance by the processor obtaining control over the control field during which the processor performs operations specified in the allowed special instruction instance, and delaying completion of execution of all other of the simultaneous special instruction instances requiring control of the control field until completion of the allowed special instruction instance.

18. A method of protecting the integrity of data stored in a computer system when the data is changeable by execution of software instructions in programs executing on plural processors in the computer system, as defined in claim 15, further comprising the step of:

making a request to a lock processor by each processor executing any special instruction instance having a blocking symbol associated with the control field, granting by the lock processor to any requesting processor exclusive access of the resource at locations specified in the allowed special instruction for a special instruction instance, unless plural processors are making simultaneous requests for plural special instruction instances using the same blocking symbol, selecting by the lock processor one of the plural processors using the same blocking symbol to allow the selected processor to complete the processing for its special instruction instance, and delaying completion of execution of all other of the simultaneous special instruction instances until completion by the selected processor of its special instruction instance.

* * * * *